E. C. McGRAW.
TIRE MAKING MACHINE.
APPLICATION FILED MAY 14, 1914.

1,333,927.

Patented Mar. 16, 1920.
6 SHEETS—SHEET 1.

Witnesses

Inventor
E. C. McGraw

By

Attorney

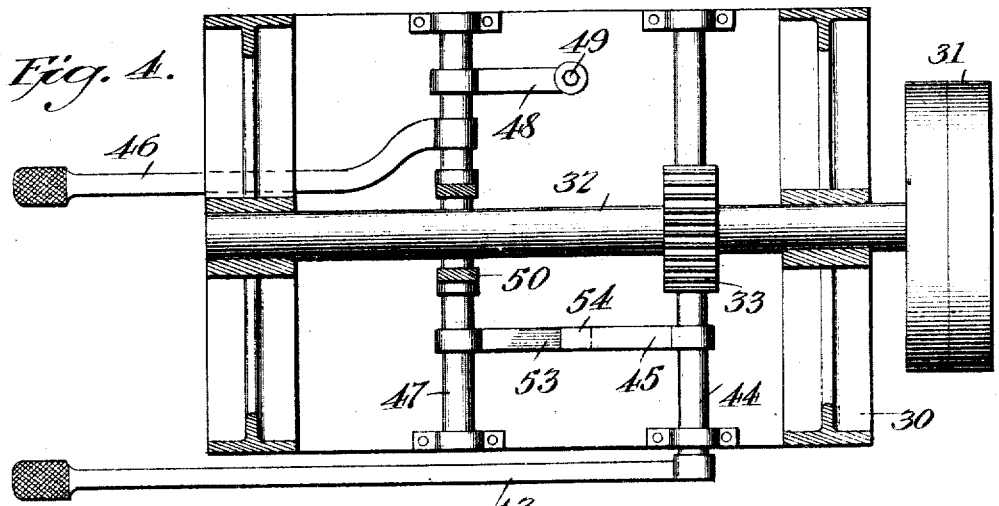
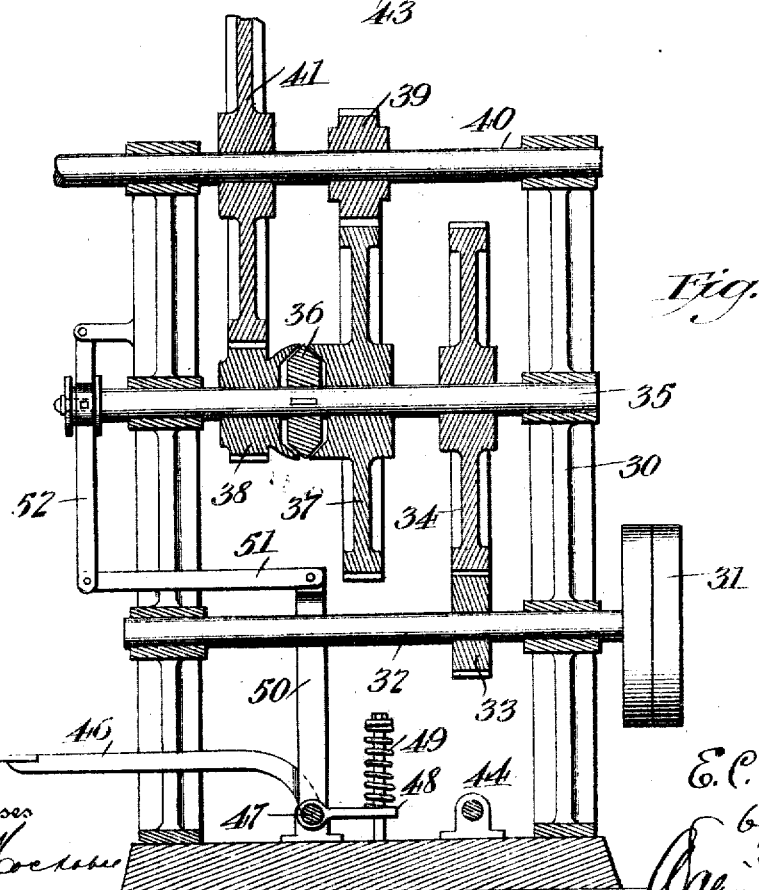

E. C. McGRAW.
TIRE MAKING MACHINE.
APPLICATION FILED MAY 14, 1914.
1,333,927.
Patented Mar. 16, 1920.
6 SHEETS—SHEET 5.
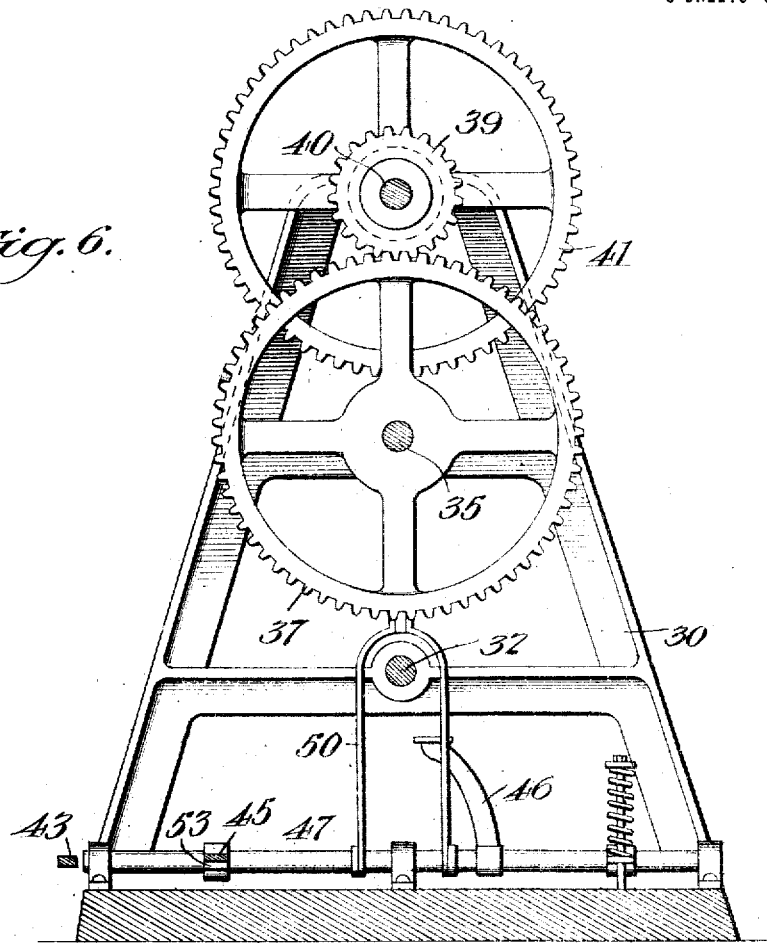
Fig. 6.
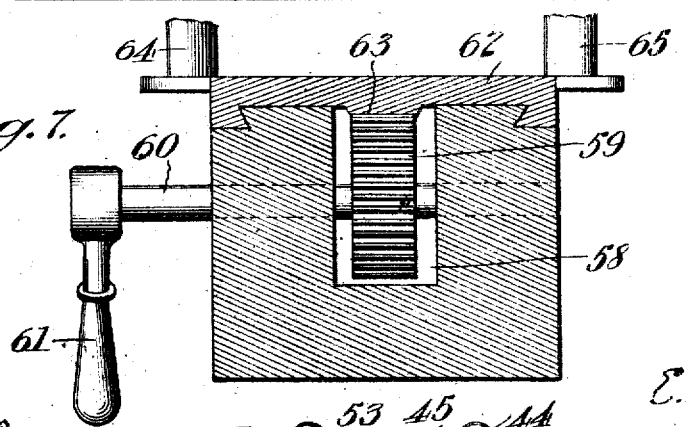
Fig. 7.
Fig. 8.
Witnesses
Inventor
E. C. McGraw E. C. McGRAW.
TIRE MAKING MACHINE.
APPLICATION FILED MAY 14, 1914.
1,333,927.
Patented Mar. 16, 1920.
6 SHEETS—SHEET 6.
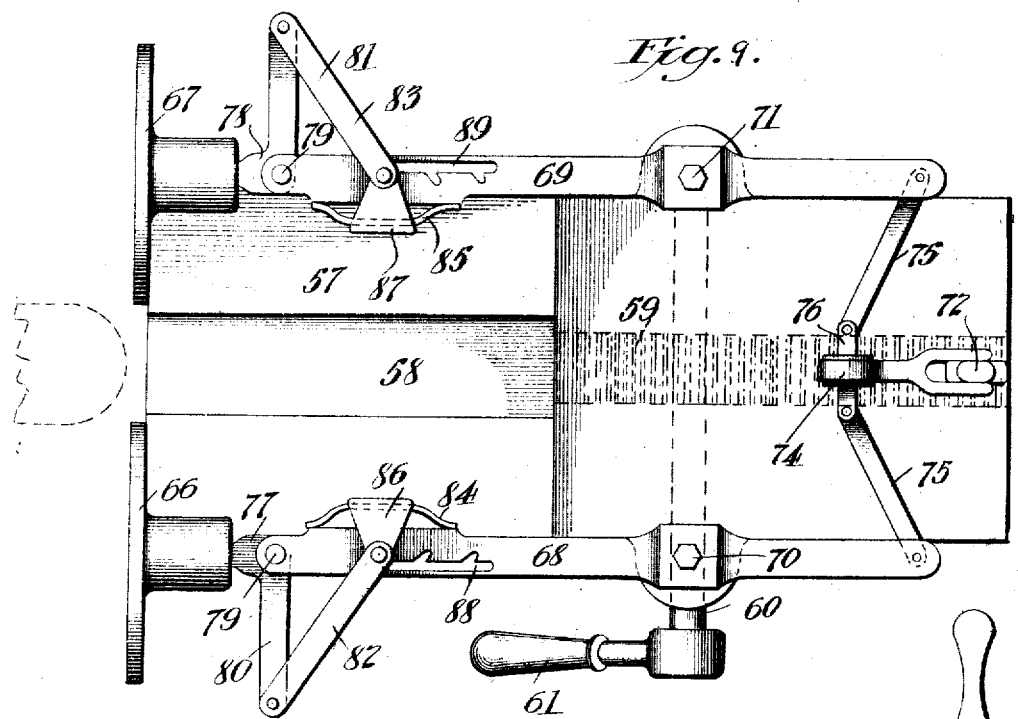
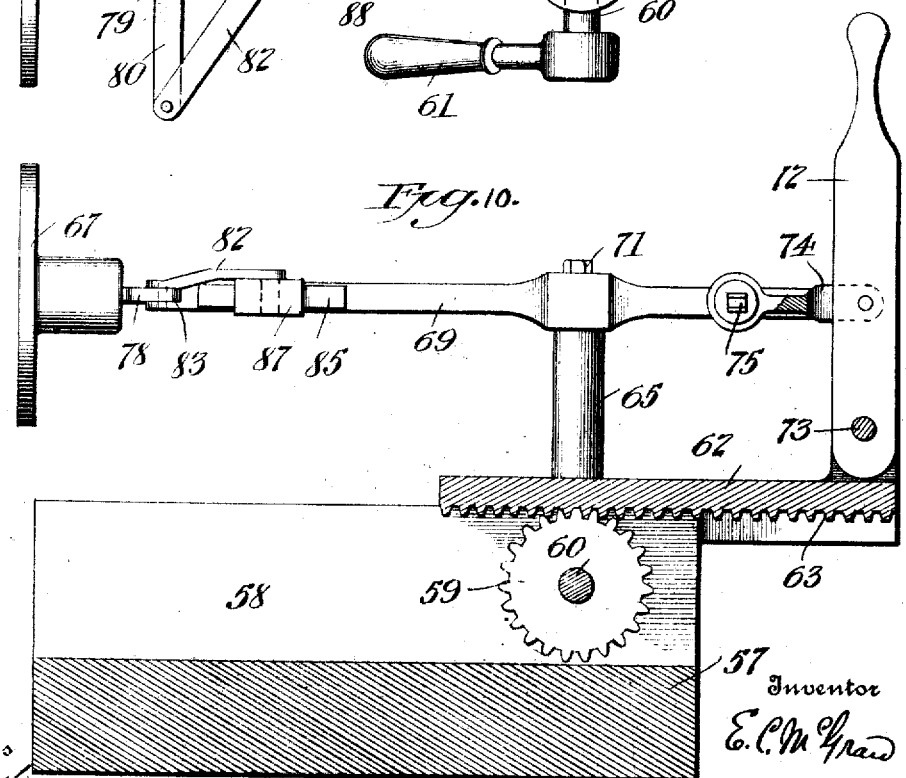
Witnesses
Leslie P. Baggett
Inventor
E. C. McGraw
By
Attorney

UNITED STATES PATENT OFFICE.

EDWIN C. McGRAW, OF EAST PALESTINE, OHIO, ASSIGNOR TO THE McGRAW TIRE AND RUBBER COMPANY, OF EAST PALESTINE, OHIO, A CORPORATION OF OHIO.

TIRE-MAKING MACHINE.

1,333,927.   Specification of Letters Patent.   Patented Mar. 16, 1920.

Application filed May 14, 1914. Serial No. 838,488.

*To all whom it may concern:*

Be it known that I, EDWIN C. MCGRAW, a citizen of the United States, residing at East Palestine, in the county of Columbiana and State of Ohio, have invented a new and useful Improvement in Tire-Making Machines, of which the following is a specification.

My invention relates to tire making machines. Its object is to provide a machine which shall be rapid and effective and yet simple in construction and operation. To this end it comprises the combinations of parts set forth in the appended claims.

In the drawings:—

Fig. 4 is a transverse section looking down upon the treadle mechanism;

Fig. 5 is a longitudinal section illustrating the gearing devices;

Fig. 6 is a side elevation of the gearing devices;

Fig. 7 is a sectional detail of the block operating device;

Fig. 8 is a detail showing the locking parts connecting the two treadles;

Fig. 9 is a plan view of the stitching or spinning mechanism; and

Fig. 10 is a side elevation partly in section of the stitching or spinning mechanism.

Figure 1:
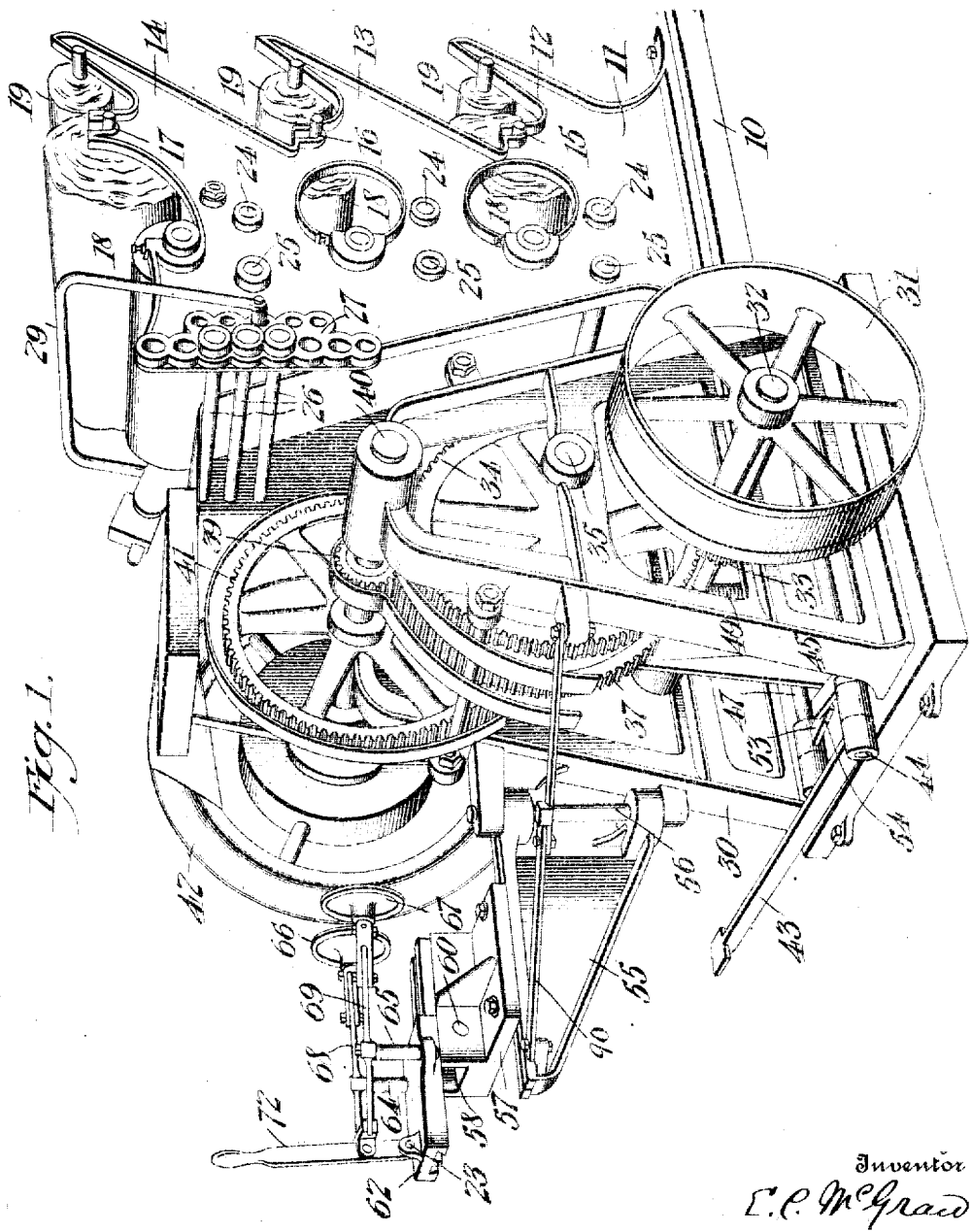
Figure 1 is a perspective view looking in at a corner of the front of the machine.
Figure 2:
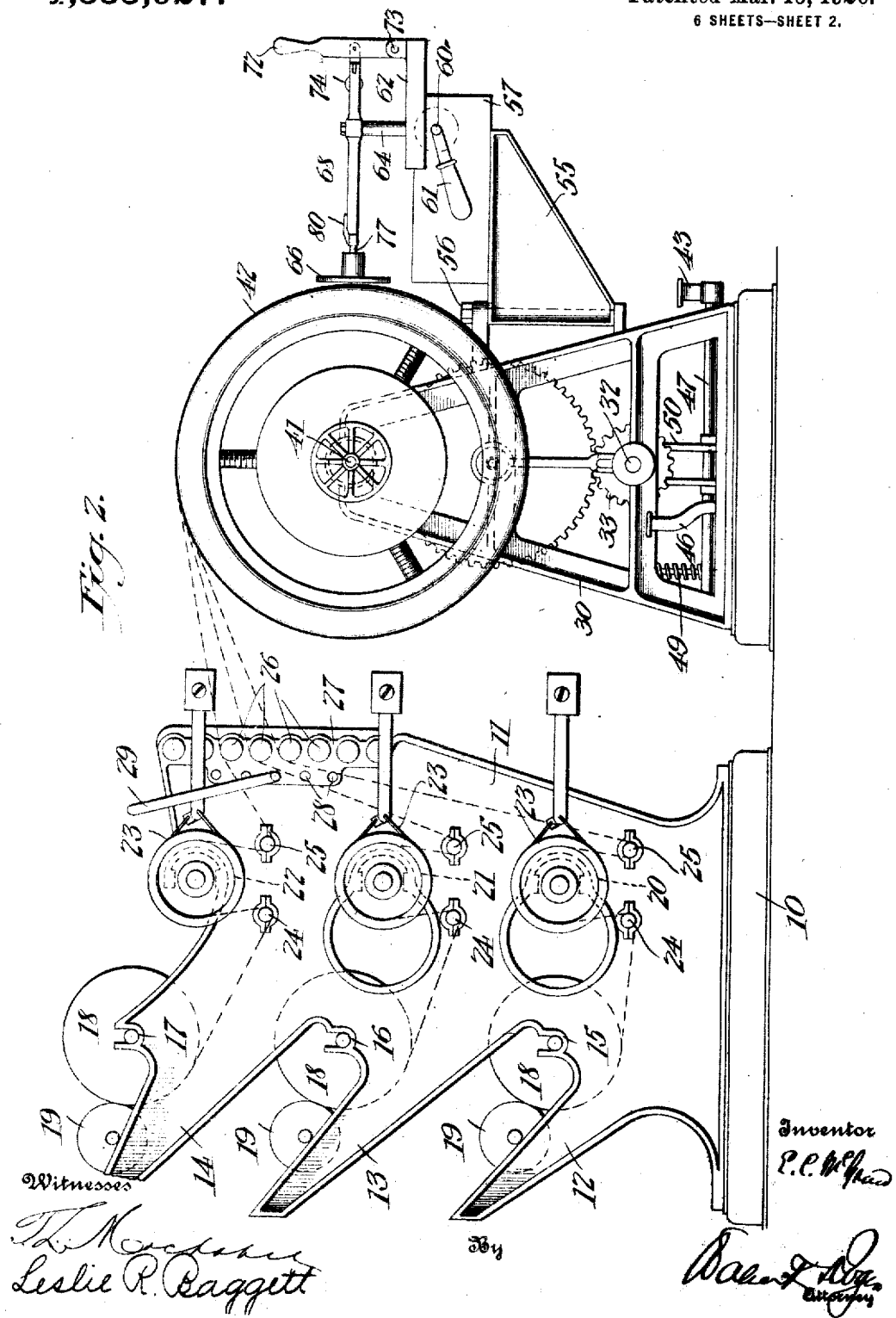
Fig. 2 is a side elevation.
Figure 3:
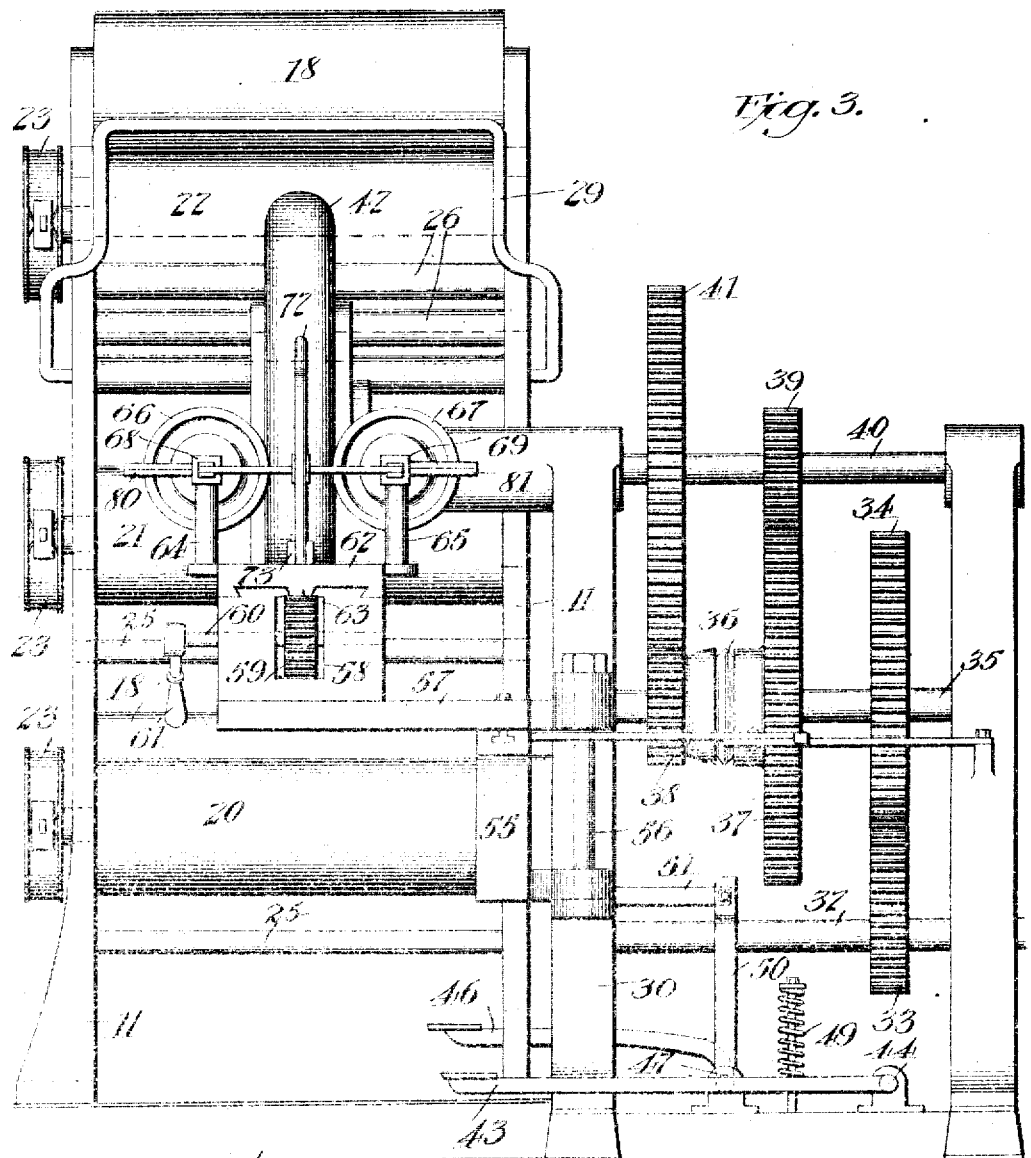
Fig. 3 is a front elevation.

In the drawings, 10 represents the base of the stock-holding and stock-feeding part of the machine, that is, the fabric supply division of the machine. 11 is a skeleton frame forming one of the ends of the fabric supply structure. 12, 13 and 14 represent rearwardly extending brackets or arms. In these brackets or arms are pockets 15, 16, 17, each of which receives an end of a core of a stock-roll 18. Each of these stock-rolls carries rubber fabric. That is, they carry the "friction" or rubber impregnated fabric about which is wound a protecting cotton fabric so that the rubber fabric in fact lies between two layers of the lining cotton fabric. As the stock-roll is operated or as the friction fabric is drawn from the stock-roll the lining fabric must be removed and wound up. 19 represents rolls for receiving the lining as it is unwound from the stock-rolls. These lining-rolls 19 play in the brackets 12, 13 and 14, the core of a roll lying on the inclined ways of a bracket, free to slide in either direction, up or down, lying normally against its corresponding stock-roll 18, and, in fact, being operated by the stock-roll as it turns, so that the discarded lining fabric is taken up by the lining-roll 19 and wound about its core. As the operation proceeds the size of the stock-roll decreases while the size of the lining-roll increases. The lining-roll is free to move in accordance with the depletion of the stock-roll and the increase of the lining-roll. Moreover, this method of placing the lining-roll makes it easy to handle so that one man can readily remove the lining-roll and its wound fabric and replace a core.

20, 21, 22 represent tension-rolls each of which is governed by a tension device 23 of customary form, comprising a band strap surrounding the tension-roll, an extending arm and an adjustable weight. 24 and 25 represent a series of guide-rolls, there being two below each tension-roll, arranged, as indicated, so that the fabric may come from a stock-roll, pass around and below the first guide-roll 24, up over the tension-roll 20 and then down and below the second guide-roll 25. The fabric thus guided passes over directing-rolls 26, which are carried by brackets 27, one at each end. I have indicated on this frame three sets of stock-rolls, lining-rolls, tension-rolls and guide-rolls, because this set comprises what is generally used. That is, means for feeding on two layers of fabric and means for then feeding and superimposing on the other layers a wider layer of fabric.

At 28 I have shown perforations in the bracket 27 any of which may support the ends of a bail 29 adapted to receive the free end of the friction fabric after it has been applied to the ring-core and cut and thrown back. By this means I have the free protruding end of the fabric convenient for the next operation.

Immediately in front of the stock-holding and stock-feeding frame lies a frame 30 which extends to one side to hold the driving mechanism. 31 represents a driving pulley, here the usual form of split pulley, which rotates a shaft 32 journaled in the frame 30. The shaft 32 rotates a pinion 33 which drives a gear-wheel 34 secured to a shaft 35, likewise journaled in the frame 30.

The shaft 35 carries a cone-clutch 36 which may engage either a gear-wheel 37 on its right or a pinion 38 on its left. I have illustrated a simple form of clutch. Obviously any one of various well-known forms may be used. When the clutch 36 engages the hub of the gear-wheel 37 it in turn rotates a pinion 39 secured to a shaft 40, likewise journaled in bearings in the frame 30. When the clutch 36 engages the pinion 38 that pinion rotates a gear-wheel 41 secured to the shaft 9. The shaft 40 bears at its outer end a ring-core 42. It is the function of the gears described to impart to the ring-core 42 at will and instantly either a low speed or a high speed. Obviously when the pinion 39 is rotated by the larger gear-wheel 37 it will rapidly rotate the ring-core. On the other hand, when the shaft 40 is turned by the gear-wheel 41 the shaft 40 will be slowly rotated imparting the slow speed to the ring-core. It will be observed that in this simple construction the three shafts lie in a vertical plane, and that by the use of the three gear-wheels and the three pinions with the governing clutch I vary the speed in accordance with the requirements of the tire making art.

I govern the operation of the clutch mechanism by two lever mechanisms though, as will be seen, one lever might serve the purpose but for the added convenience of the two. A treadle 43 serves to partially rotate a shaft 44. Extending from the shaft 44 is a bar 45 whose function will be described. Another treadle 46 serves to partially rotate a shaft 47 journaled in the frame and having an extending arm 48 spring-pressed, as indicated at 49. The shaft 47 bears substantially at its center a yoke 50 which embraces the shaft 32 and is pivoted to a connecting horizontal link 51 which in turn is pivoted to a connecting link 52 having a yoke which takes about the end of the shaft 35 engaging collars thereon so as to reciprocate the shaft 35 and thereby adjust the clutch 36. A downward pressure on the treadle 46 will serve to draw out the link 52 and to bring the clutch into position for low speed; while the release of the treadle 46 will have the opposite effect. From one end of the shaft 47 projects an arm 53 which extends beneath the arm 45, the two lapping, as indicated at 54. The purpose of this is that the parts connected with the treadle 46 may be operated through the medium of the treadle 43 if desired. The parts might be operated by the treadle 46 by first pressing down upon the treadle for low speed and then lifting it up for high speed. The treadle 43 produces the same effect when it is pressed down as the treadle 46 does when it is lifted, and I have, therefore, provided it for the convenience of the operator who then may stand in front of the ring-core, and so that he may conveniently press down the treadle 43 when he wants high speed.

55 represents a bracket pivoted at 56 to the ring-core frame. On the bracket 55 rests a block 57 which has an in-cut rib or T-rib at one side lying in a complemental groove in the top of the bracket.

The block 57 has a central groove 58, in which lies a pinion 59 secured to a shaft 60, operated by a hand lever 61, so that a slide plate 62 fitted on the block 57, and dovetailed, as indicated, may be readily and rapidly adjusted to and from the ring-core 42 which lies immediately in front. To secure this adjustment the pinion 59 engages a rack 63 on the bottom of the slide 62. From the slide 62 project ears and from these ears rise posts 64 and 65, which are intended to carry the arms for operating the spinning wheels 66 and 67. These stitching or spinning wheels and their axial supports are carried by two arms 68 and 69.

Pivoted to the posts at 70 and 71 the arms 68 and 69 are operated by a common, central hand-lever 72, pivoted to the slide at 73. The hand-lever operates through a yoke 74 and connecting links 75, which are pivoted at one end to a short shaft 76 having collars surrounding the end of the yoke 74 and are pivoted at the other end to the arms 68 and 69. The stitching or spinning wheels, as here illustrated, are carried at the end of short arms or shafts 77, 78, and each of these shafts is riveted at 79 to the end of a carrying arm. Each of the short shafts 77, 78 has a right angle extension 80, 81, to the end of each of which is connected an arm 82 or 83 forked at one end to embrace the corresponding arm 68 or 69 and relatively secured in place by pins. On the inside of each arm 68 and 69 is a flat spring 84, 85, held by straps or clips 86, 87, through which the pin also passes so that the yoke link for operating the stitching or spinning wheel is thus spring drawn. In each arm 68 and 69 are recesses 88 and 89, with inclined pockets into which the pin may snap or be snapped by the spring. This arrangement of inclined pockets is intended to permit the stitching or spinning wheels to be set at different angles so that they may first, for example, spin under the tire-bead, then over the bead, and then beyond the bead. In the last operation I get a particularly good result because I am able to turn the wheel at a short angle, pointing out toward the operator and running the wheel in sharply beyond the bead. In thus working with stock over the bead, it has heretofore been necessary to do it by hand, because no provision had been made for getting the necessary three angles of the stitching or spinning wheel.

At 90 is illustrated an arm which controls the movement of the block and the stitching or spinning mechanism so that the whole of that mechanism may be swung to one side, turning on the pivot roll 56, the arm 90 breaking joint, as indicated, so that the mechanism may be easily moved out of the road by the operator and yet brought back and held firmly during the operation.

It will be observed that by the open, vertical arrangement of the series of stock-rolls, that is, one above another and spaced apart and by the similar arrangement of the tension rolls which are relatively placed below the plane of each corresponding stock roll, I secure great capacity for the several layers of fabric within a limited space, while the rolls are easily accessible. The ring-core is disposed centrally and opposite the rolls and the stitching or spinning mechanism lies behind the ring-core so that all the parts on each side are arranged in a compact system which at the same time permits easy access for adjustment or repair.

The operating and adjusting handles are within easy reach of the operator who stands behind the ring-core and the machine may be said to be, in fact, a semi-automatic machine which I consider best adapted for the purposes of tire making. The treadles are within easy reach of the operator and they are placed so that one may be operated from the rear and one from the side, depending upon the position, or both the high and low speed may be governed by one treadle, as described.

In the operation of this machine the operator draws from the supply frame the web fabric. He has started the machine by pressing down the treadle 46 so that the ring-core is slowly rotated. This has been caused by the shaft 35 being drawn to the left so that the cone clutch 36 engages the pinion 38 and thus rotates the gear-wheel 41 and the shaft 40. The operator feeds the layer or layers of fabric over the ring-core as he would do in the use of the hand operated ring-core until he has placed the tread around and about the core. He then cuts the fabric, throwing the free end out of the way over the bail 29. During this operation the block 57 carrying the stitching or spinning mechanism has been pushed to one side swinging with the bracket 55. It is now thrown back swinging in place in front of the ring-core. The operator adjusts the block 57 by the operation of the hand lever 61 which rotates pinion 59 and reciprocates the slide 62, and pushing over the handle feeds it forward. At the same time by pulling out toward him the center handle 72 he brings the stitching or spinning wheels 66 and 67 into operation upon the fabric previously laid about the ring-core by the operator. As the operator proceeds he may, for the different operations, shift the angle of the stitching or spinning wheels, pushing in the part 87 so that the arms 82 and 83 may slide forward or backward to permit their pins to slip into place in one of the notches of the recess 88 and 89. Practically the same operation follows for each layer of fabric. Through the manipulation of the treadle 46 a low speed has been applied to the ring-core while the fabric is being placed upon it, but when the stitching or spinning mechanism is ready to operate high speed is obtained, as described, either by lifting the treadle 46 or depressing the treadle 43.

I have described what I have found in actual operation to be a simple and efficient semi-automatic mechanism. It will be understood, of course, that the various parts may be changed in form and that such casual parts, for example, as the bail 29 may be omitted or modified without departing from the spirit of my invention.

It will be understood that while I have referred to a split pulley any form of pulley may be used and, in fact, I have shown both forms in the illustration, a plain flanged pulley being shown in Fig. 1.

Furthermore, while I have referred to a method of applying layers of fabric to the different rolls and have shown how my arrangement of stock-rolls and tension-rolls is especially adapted to such an end it is clear that I may vary the particular arrangement of the different widths, having, if necessary, a different width on each of the stock-rolls or, for example, as is sometimes done, the same width on the lower two rolls and a wider on the upper rolls.

I claim:—

1. In a tire-making machine, the combination of a pair of pivoted arms, each arm carrying at one end a spinning roll and at the other end a link pivoted to the corresponding arm, and a hand lever connected to an end of each link.

2. In a semi-automatic tire-making machine, the combination of a block, a slide, means for moving the slide on the block, a pair of posts carried by the slide, an arm pivoted to each post, a spinning device carried by each arm, a hand lever pivoted to the slide and pivotally connected to the arms to enable the operator to press the spinning devices against the tire casing under treatment.

3. A machine of the character described, comprising a frame, a power driven annular form mounted in said frame, a carriage slidably mounted on said frame, a pair of levers pivotally mounted on said frame, a stitching roller rotatably mounted upon each of said levers adjacent said annular form, a link pivotally connected to the opposite extremity of each of said levers, a head pivotally connected to each of said links, a third link pivotally connected to said head and a lever pivoted at its lower extremity to said carriage, said lever being pivotally connected to said last named link.

4. In a device of the character described, the combination of a housing and a rotatable form carried thereon, of a bracket hingedly connected to the vertical edge of said housing adjacent said form and arranged for movement in a horizontal plane, a table carried at one side of said bracket and arranged to be located in front of said form when the bracket is in the open position, links pivotally connected to said bracket and said housing and arranged to normally hold said stitching table in operative position in relation to said form, and means for limiting the movement of said bracket when it is folded against the housing.

In testimony whereof I have hereunto signed my name in the presence of two witnesses.

EDWIN C. McGRAW.

Witnesses:
L. M. KYES,
C. E. MILEY.